(12) United States Patent
Kloper et al.

(10) Patent No.: US 8,111,783 B2
(45) Date of Patent: Feb. 7, 2012

(54) CAPTURING AND USING RADIO EVENTS

(75) Inventors: David Kloper, Hudson, OH (US);
Yohannes Tesfai, Silver Spring, MD (US); Chandra Vaidyanathan, Cleveland, OH (US)

(73) Assignee: Cisco Technology, Inc., San Jose, CA (US)

( * ) Notice: Subject to any disclaimer, the term of this patent is extended or adjusted under 35 U.S.C. 154(b) by 768 days.

(21) Appl. No.: 12/140,707

(22) Filed: Jun. 17, 2008

(65) Prior Publication Data

US 2009/0310661 A1 Dec. 17, 2009

(51) Int. Cl.
*H03K 9/00* (2006.01)
*H04L 27/00* (2006.01)

(52) U.S. Cl. .......................... 375/316; 375/239; 375/353
(58) Field of Classification Search .................... 375/295
See application file for complete search history.

(56) References Cited

U.S. PATENT DOCUMENTS

| | | | |
|---|---|---|---|
| 6,507,603 B1 * | 1/2003 | Haga et al. .................... | 375/147 |
| 6,714,605 B2 | 3/2004 | Sugar et al. | |
| 7,184,777 B2 | 2/2007 | Diener et al. | |
| 7,254,191 B2 | 8/2007 | Sugar et al. | |
| 7,292,656 B2 | 11/2007 | Kloper et al. | |
| 2004/0028003 A1* | 2/2004 | Diener et al. ................. | 370/319 |
| 2005/0185737 A1* | 8/2005 | Yamauchi ..................... | 375/316 |
| 2007/0064744 A1* | 3/2007 | Aytur et al. .................... | 370/503 |
| 2007/0066259 A1* | 3/2007 | Ryan et al. ................. | 455/234.1 |
| 2007/0297524 A1* | 12/2007 | Jones et al. .................... | 375/260 |
| 2008/0130599 A1* | 6/2008 | Horikoshi et al. ............. | 370/338 |
| 2009/0046625 A1* | 2/2009 | Diener et al. .................. | 370/319 |
| 2010/0118694 A1* | 5/2010 | Shibata ......................... | 370/210 |
| 2010/0226456 A1* | 9/2010 | Ariyavisitakul .............. | 375/267 |

* cited by examiner

*Primary Examiner* — David C. Payne
*Assistant Examiner* — Erin File
(74) *Attorney, Agent, or Firm* — Edell, Shapiro & Finnan, LLC (57) ABSTRACT

In one embodiment a method includes, collecting in-phase/quadrature (I/Q) data representing energy detected by a radio in a frequency band, performing a fast Fourier transform (FFT) on the I/Q data resulting in a stream of FFT blocks, identifying using the stream of FFT blocks a pulse in the frequency band, recording in a radio events record (RER) a plurality of radio events and corresponding timestamps that are indicative, respectively, of a type and time of individual state changes in the radio during the collecting step, and, for example, using at least two of the radio events to identify, in the time domain, a beginning time and end time of the pulse detected in the stream of FFT blocks.

22 Claims, 11 Drawing Sheets

Radio Events Record

| EVENT | TIMESTAMP | VALUE / PARAMETER |
|---|---|---|
| GAIN CHANGE | $t_1$ | |
| RSSI CHANGE | $t_2$ | |
| RSSI CHANGE | $t_3$ | |
| GAIN CHANGE | $t_4$ | |
| . . . . . . | $t_n$ | |

Radio Events Record

| EVENT | TIMESTAMP | VALUE / PARAMETER |
|---|---|---|
| GAIN CHANGE | $t_1$ | |
| RSSI CHANGE | $t_2$ | |
| Preamble Detect | $t_3$ | |
| PHY HEADER Detect | $t_4$ | |
| MAC CRC Detect | $t_5$ | |
| . | | |
| . | | |
| . | | |
| . . . . . . | $t_n$ | |

CAPTURING AND USING RADIO EVENTS

FIELD OF THE INVENTION

Embodiments of the present invention relate to capturing radio events that can be used to augment or optimize spectrum analysis of, for example, a wireless frequency channel.

BACKGROUND OF THE INVENTION

The explosive growth in wireless applications and devices over the past few years has produced tremendous public interest benefits. Wireless networks and devices have been deployed in millions of offices, homes, and more recently, in increasing numbers of public areas. These wireless deployments are forecast to continue at an exciting pace and offer the promise of increased convenience and productivity.

This growth, which is taking place mostly in the unlicensed bands, is not without its downsides. In the United States, the unlicensed bands established by the Federal Communications Commission (FCC) consist of large portions of spectrum at 2.4 GHz and at 5 GHz, which are free to use. The FCC currently sets requirements for the unlicensed bands such as limits on transmit power spectral density and limits on antenna gain. It is well recognized that as unlicensed band devices become more popular and their density in a given area increases, efficient use of those bands may suffer.

Compounding general increased usage is the fact that the types of signaling protocols used by devices in the unlicensed bands are not designed to cooperate with signals of other types also operating in the bands. For example, a frequency hopping signal (e.g., a signal emitted from a device that uses the Bluetooth™ communication protocol or a signal emitted from certain cordless phones) may hop into the frequency channel of an IEEE 802.11 wireless local area network (WLAN), causing interference with operation of the WLAN. Spectrum analysis of a wireless channel can provide helpful insights into potentially interfering signals or energy.

DETAILED DESCRIPTION

Overview

Embodiments of the present invention provide systems and methods for reducing processing in a spectrum analysis system having a radio, an optional demodulator, and a spectrum analysis module. A method includes collecting in-phase/quadrature (I/Q) data representing energy detected by the radio in a frequency band, performing a fast Fourier transform (FFT) on the I/Q data resulting in a stream of FFT blocks, identifying, using the stream of FFT blocks, a pulse in the frequency band, and recording in a radio events record (RER) a plurality of radio events and corresponding timestamps that are indicative, respectively, of a type and time of individual state changes in the radio during the collecting step. With such an RER, it is then possible to, for example, more accurately identify a beginning time and an end time of the pulse, even where the beginning time or end time might fall within boundaries of a given FFT block.

Examples of radio events that may be recorded and used in connection with embodiments of the present invention include a gain change associated with an automatic gain control (AGC) loop, a change in a received signal strength indicator (RSSI), and a transmit on/off signal, as well as protocol-based events, such as detection of a packet preamble, a PHY (physical layer) header and/or a passed media access control cyclic redundancy check (MAC CRC).

Description of Example Embodiments

Figure 1:
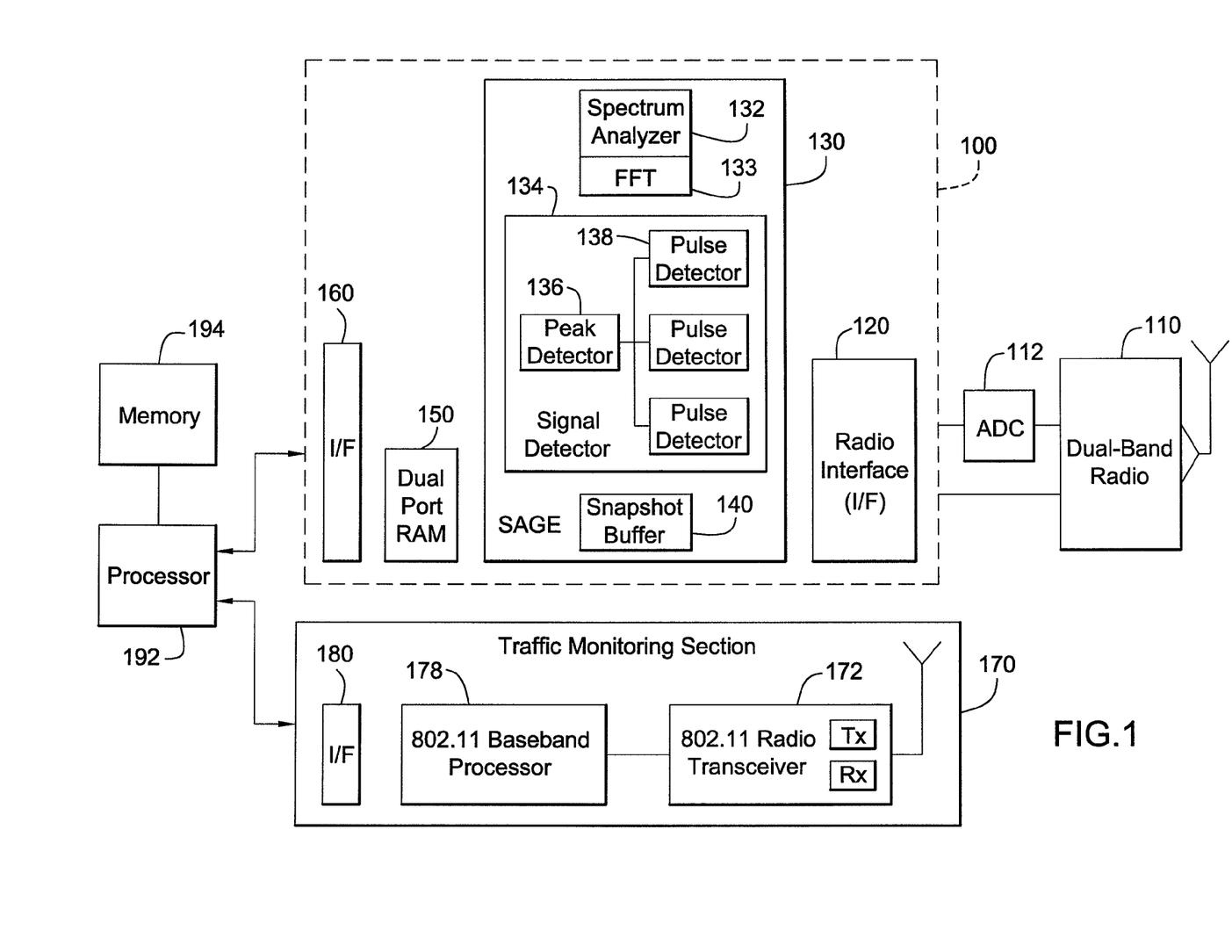
FIG. 1 is a block diagram of a system having a traffic monitoring section and spectrum monitoring section.

To obtain insight into a wireless channel or frequency band, a spectrum analysis engine (also referred to as "SAgE") may be employed. A sensor that includes a SAgE includes, as shown in FIG. 1, a spectrum monitoring section 100 to monitor RF activity in the frequency band and a traffic monitoring section 170 that is capable of sending and receiving traffic according to a communication protocol, such as an IEEE 802.11 WLAN protocol. The spectrum monitoring section 100 comprises a radio 110 (primarily for receive operations) that is capable of tuning to receive energy at each channel (or simultaneously all channels in a wideband mode) of, for example, any of the unlicensed bands (2.4 GHz and 5 GHz) in which IEEE 802.11 WLANs operate. An analog-to-digital converter (ADC) 112 is coupled to the radio 110 and converts the downconverted signals from the radio 110 to digital signals. A radio interface (I/F) 120 is coupled directly to the radio 110 and also to the output of the ADC 112. A spectrum analysis engine (SAGE) 130 is coupled to the radio I/F 120. In one embodiment, the SAGE 130 includes a spectrum analyzer 132, a signal detector 134 having a peak detector 136 and one or more pulse detectors 138, and a snapshot buffer (SB) 140. A Fast Fourier Transform (FFT) module 133 is coupled between the radio I/F 120 and the spectrum analyzer 132, or, as shown in FIG. 1, included in the spectrum analyzer 132. The SAGE 130 generates spectrum activity information that is used to determine the types of signals occurring in the frequency band, and captures signals for location measurement operations. A dual port random access memory (RAM) 150 is coupled to receive the output of the SAGE 130 and a processor I/F 160 interfaces data output by the SAGE 130 to a processor 192, and couples configuration information from the processor 192 to the SAGE 130. A memory 194 is accessible to the processor 192 for storage of data and program instructions.

The functions of the SAGE 130 will be briefly described in further detail hereinafter. The spectrum analyzer 132 generates data representing a real-time spectrogram of a bandwidth of radio frequency (RF) spectrum, such as, for example, up to 100 MHz. The spectrum analyzer 132 may be used to monitor all activity in a frequency band, for example, the 2.4-2.483 GHz ISM band, or the 5.15-5.35 GHz and 5.725-5.825 GHz bands. The FFT module 133 is, for example, a 256 frequency bin FFT processor that provides (I and Q) FFT data for each of 256 frequency bins that span different dwells that span the bandwidth of a frequency band of interest. A spectrum correction block may be included to correct for I and Q channel imbalance by estimating an I-Q channel imbalance parameter related to phase error and amplitude offset between the I and Q channels, and to suppress a side tone resulting from the RF downconversion process. The spectrum analyzer 132 may further comprise a power computation block to output a power value for each FFT frequency bin. The spectrum analyzer 132 may further include a statistics logic block (not shown) that has logic to accumulate statistics for power, duty cycle, maximum power and a peaks histogram. Statistics are accumulated in the dual-port RAM 150 over successive FFT time intervals or blocks. As mentioned, an FFT block may comprise 256 samples (in this case), and thus a "time interval" is equivalent to 256/40 (MHz)=6.4 µs. After a certain number of FFT intervals, determined by a configurable value stored in control registers (not shown), an interrupt is generated to output the statistics from the dual-port RAM 150. For example, the statistics are maintained in the dual-port RAM 150 for 10,000 FFT intervals before the processor reads out the values. The power versus frequency data generated by the spectrum analyzer 132 may also be used as input to the signal detector.

The signal detector 134 detects signal pulses in the frequency band and outputs pulse event information entries, which include one or more of the start time, duration, power, center frequency and bandwidth of each pulse that satisfies configurable pulse characteristic criteria associated with a corresponding pulse detector.

In the signal detector 134, the peak detector 136 looks for spectral peaks in the (power versus frequency data derived from FFT block output), and reports the bandwidth, center frequency and power for each detected peak. The output of the peak detector 136 is one or more peaks and related information. The pulse detectors 138 detect and characterize signal pulses based on input from the peak detector 136.

The snapshot buffer 140 collects a set of raw digital signal samples useful for signal classification and other purposes, such as location measurements. The snapshot buffer 140 can be triggered to begin sample collection from either the signal detector 134 or from an external trigger source, such as a signal from the processor to capture received signal data for a period of time sufficient to include a series of signal exchanges used for location processing explained hereinafter. Alternatively, the snapshot buffer 140 can be in a free-running state continuously storing captured data, and then in response to detecting the first signal (e.g., a Probe Request frame), the snapshot buffer 140 is put into a post-store mode that extends long enough to capture an ACK frame signal data.

The traffic monitoring section 170 monitors packet activity in a wireless network, e.g., a WLAN, and sends and receives certain packets that are used for location measurement processes. For example, the system may transmit an 802.11 Probe Request frame, data frame or request-to-send frame that may be addressed to the device to be located. It should also be understood that traffic monitoring section 170 could also function as a WiFi access point, and not merely operate as an "outside observer." Included in the traffic monitoring section 170 are a radio transceiver 172 (comprising a transmitter Tx and a receiver Rx) and a baseband signal processor 178. The radio transceiver 172 and baseband signal processor 178 may be part of a package chipset available on the market today, such as an 802.11 WLAN chipset for any one or more of the 802.11a/b/g/n or other WLAN communication standards. The baseband signal processor 178 is capable of performing the baseband modulation, demodulation and other physical (PHY) layer functions compliant with the one or more communication standards of interest (e.g., IEEE 802.11a,b,g,h, etc.). An I/F 180 couples the baseband signal processor 178 and radio transceiver 172 to the processor 192.

While the system of FIG. 1 provides significant capabilities, there are ways in accordance with the present invention to enhance spectrum analysis functionality and efficiency.

Figure 2:
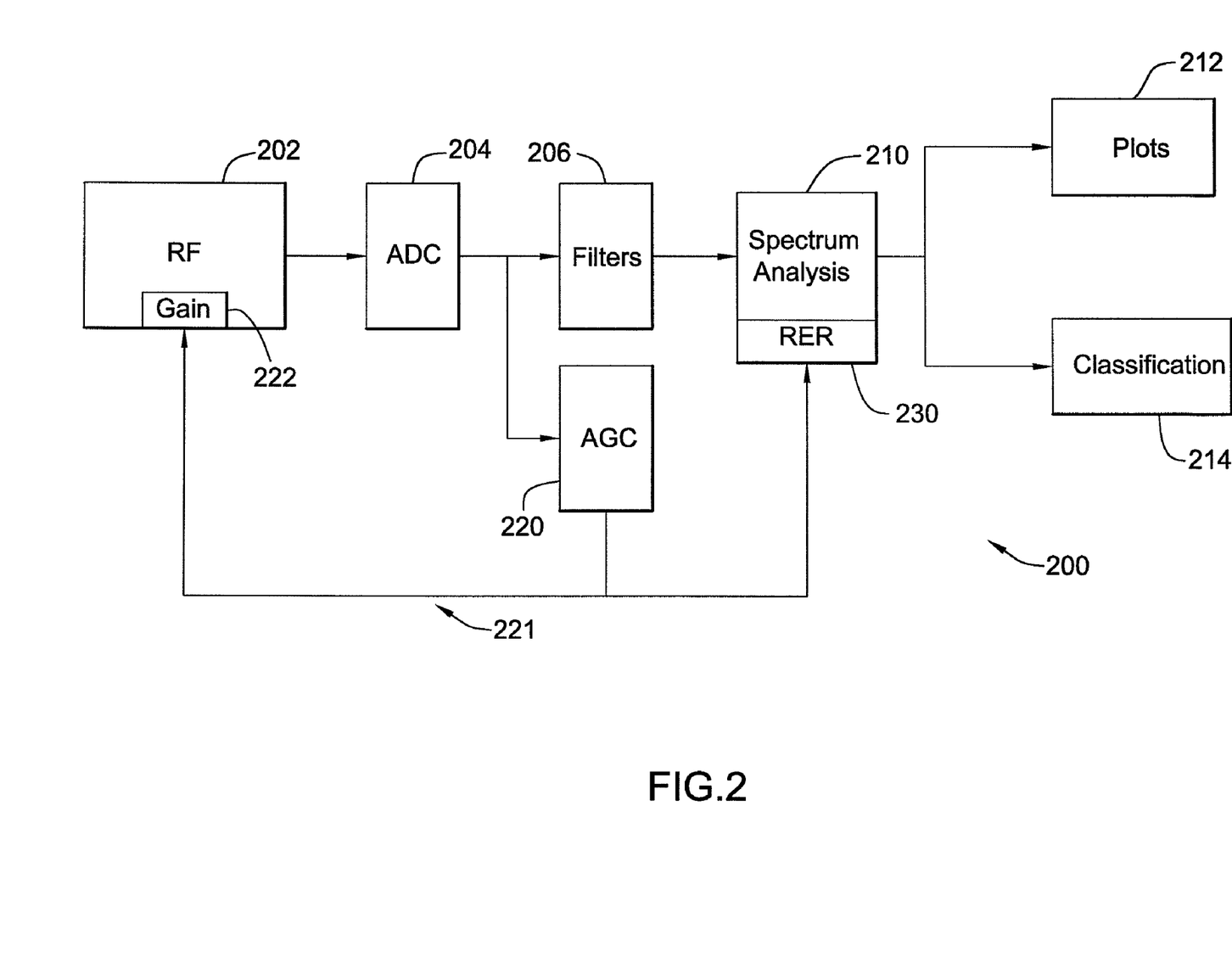
FIG. 2 is a block diagram of a system including a spectrum analysis engine used to plot and classify pulses detected in a selected frequency band in accordance with an embodiment of the present invention.

FIG. 2 shows a block diagram of system 200 that provides spectrum analysis with respect to wireless channels as described substantially above. More specifically, FIG. 2 depicts a radio frequency (RF) receiver 202 that receives over-the-air transmissions, and feeds the received signals to an analog-to-digital converter (ADC) 204 for digitization. The resulting digitized signals are filtered with filters 206 and then passed to spectrum analysis module 210 for simultaneous processing. Spectrum analysis module 210 may be configured, for example, similarly to spectrum monitoring section 100 of FIG. 1. Of course, other configurations may be employed.

Further, in a preferred embodiment, a plots module 212 and a classification module 214 are in communication with spectrum analysis module 210 and are provided, respectively, to provide a visual representation of the spectrum analysis on a display for a user to view, and to provide an indication of the types of signals that are present in a given band that is being monitored by the spectrum analysis module 210.

Also shown in FIG. 2 is an automatic gain control (AGC) block 220 and loop 221 that feeds a gain level circuit or module 222 in RF receiver 202. As is well-known in the art, AGC is an adaptive function that monitors an output signal and provides feedback to adjust the gain to an appropriate level for a range of input signal levels. In other words, AGC may be used to ensure that, e.g., the analog-to-digital converter (ADC) 204 is not saturated or under driven.

As mentioned earlier, the SAgE or spectrum analysis module 210 relies to a large extent on an FFT-based approach to spectrum analysis and signal classification. The FFT engine 133 (shown in FIG. 1) within spectrum analysis module 210 computes a spectrogram which is used for display and/or to identify pulses in both time and frequency domains. Pulse identification can be effective in aiding post-processing of the original input I/Q data.

In accordance with one implementation of an embodiment of the present invention, FFTs are computed on a block of samples ($N_{FFT}$). An FFT based approach provides frequency resolution at the expense of time resolution (they both depend on the size of the FFT block, where larger FFT block lengths result in finer frequency resolution but poorer time resolution). For example, with a sampling rate of 20 MHz:

For $N_{FFT}$=256, frequency resolution=78.125 kHz (20/256), and time resolution=12.8 us; and For $N_{FFT}$=128, frequency resolution=156.25 kHz (20/128), time resolution=6.4 us.

Figure 3:
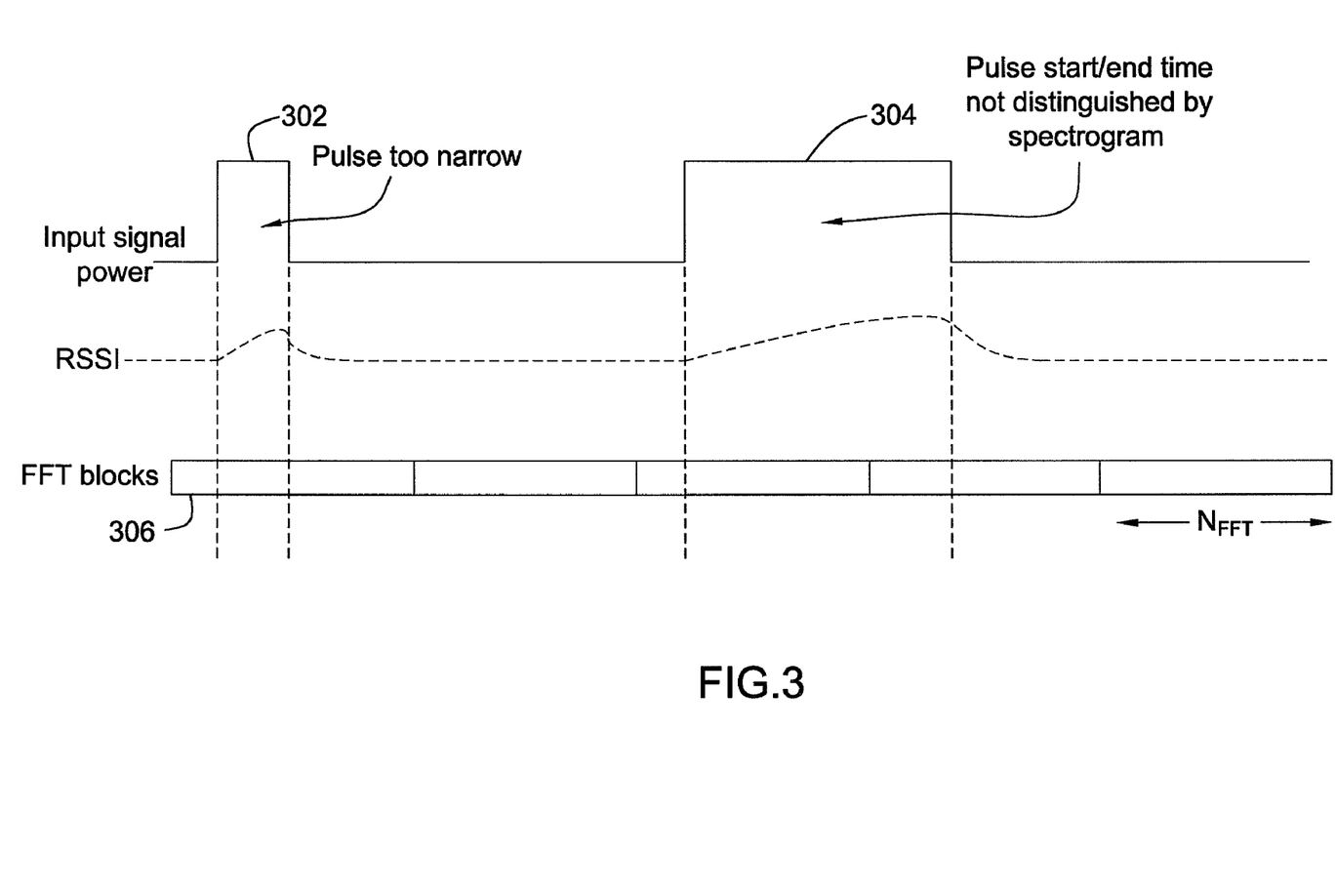
FIG. 3 is a timing diagram showing relationships between fast Fourier transform (FFT) blocks and detected pulses.

Increasing the FFT size improves resolution, but pulses shorter than an FFT block duration will not be detected, as shown for pulse 302 in FIG. 3. Furthermore, pulses with short gaps (1-3 FFTs wide) may be hard to distinguish.

Further still, and as also shown in FIG. 3, using FFT-based engines for signal detection may also result in loss of resolution on start-time and end-time of pulses. For instance, pulse 304 of FIG. 3 starts and ends within or inside the boundaries of successive FFT blocks, and thus the pulse's start and end points do not coincide with the end points or boundaries of the respective FFT blocks. As such, precise pulse start and end points of given pulses may be hard to identify and catalog based only on the output of an FFT engine.

Furthermore, as explained above, to compensate for input signal level variations AGC loop 221 is used. Typically, such a loop 221 operates "fast." Accordingly, it may be important to know when AGC changes occur so as to be able to better interpret the original I/Q capture data in that such AGC changes can detrimentally impact the usefulness of an FFT block coinciding in time with an AGC change.

Thus, to address the foregoing, among other things, and in accordance with embodiments of the present invention, a Radio Events Record (RER) is provided to capture state changes of the AGC, among other things, along with corresponding timestamps and indices into the capture stream(s). The RER information is then used to supplement the FFT data in an effort to reduce the processing time of the I/Q data and provide more precise and efficient analysis.

Figure 4:
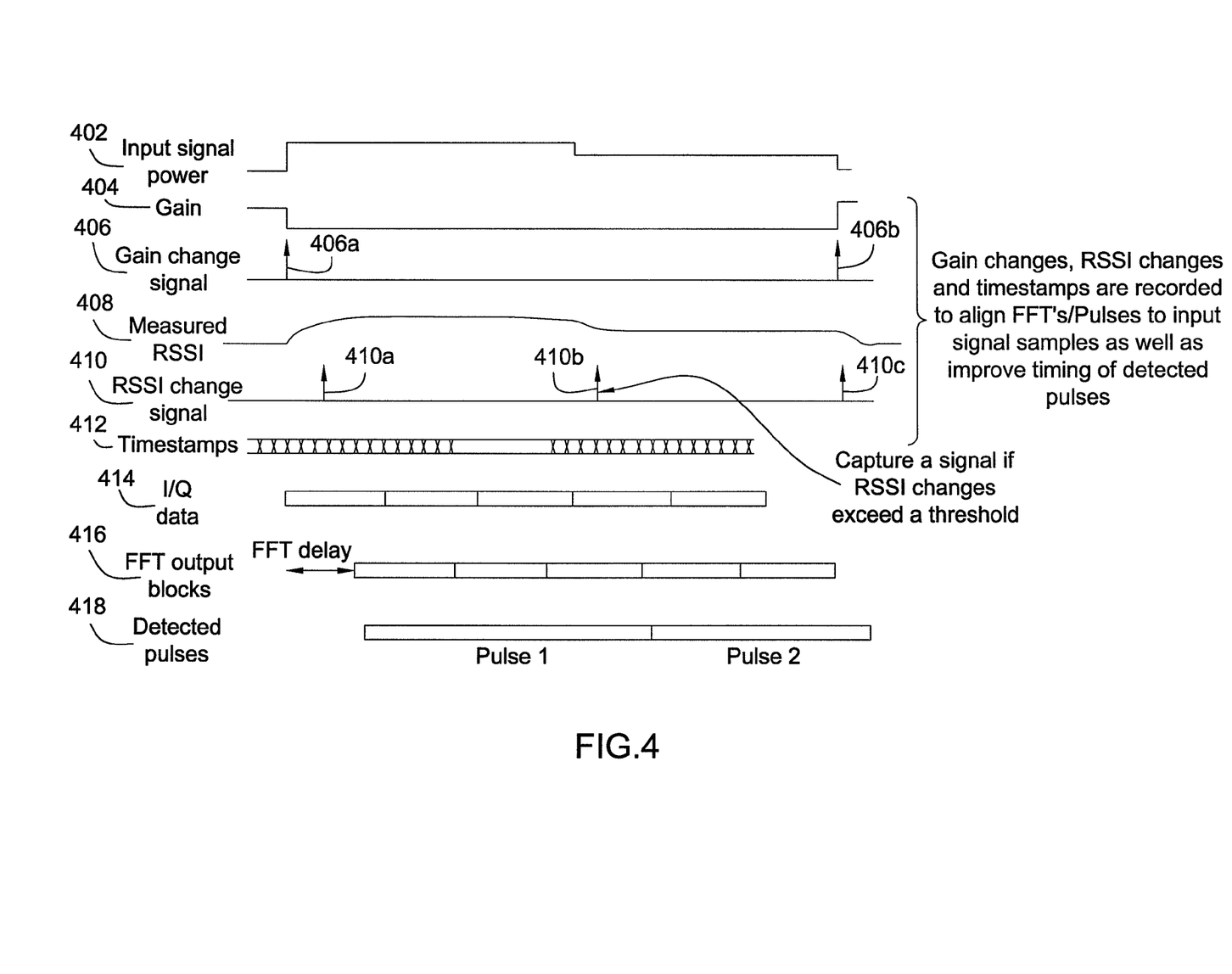
FIG. 4 shows a timing diagram that includes monitored radio events for a radio event record in accordance with an embodiment of the present invention.

With reference now to FIG. 4, there is shown a timing diagram including an input signal 402, comprising individual pulses that changes over time, and a gain setting signal 404 that represents, e.g., a signal provided by AGC loop 221 of FIG. 2. A gain change signal 406 is represented by arrows 406a and 406b, which correspond to transition points of the gain setting signal 404. Element 412 of FIG. 4 represents a series of timestamps (or markers) that are used to keep track of a precise time at which, e.g., gain changes 406a and 406b have occurred. In accordance with the present invention, a Radio Events Record (RER) is generated like that shown in FIG. 5. For each gain change that the radio executes, a corresponding entry is made in the RER table. The RER table may be implemented in an RER module 230, as shown in FIG. 2 that is in communication with AGC module 220. Spectrum analysis can thus be augmented with these radio events by, e.g., enabling analysis algorithms to more quickly "zero in" on I/Q data that corresponds in time with pulse events of the monitored spectrum. For instance, it may be assumed that a pulse event is bounded, substantially, in time by the timestamps of two successive gain change events. Accordingly, only a subset of the captured I/Q data need be analyzed to identify/classify a given pulse.

Similarly, a radio typically monitors measured RSSI 408. In accordance with the present invention, an RSSI change signal 410 may thus also be generated. Typically, such a signal would be generated when the absolute value of an RSSI change is more than a predetermined value. Thus, as shown in FIG. 4, arrows 410a, 410b and 410c represent moments in time when the RSSI has changed more than a predetermined value or threshold. These RSSI change events are likewise recorded along with a corresponding timestamp in the RER table of FIG. 5 and used to augment, as desired, the spectral analysis functionality of the system.

Again with reference to FIG. 4, the incoming I/Q sample data 414 is shown corresponding in time with, e.g., the input signal power 402. The output of the FFT engine, namely FFT output blocks 416, however, is delayed somewhat due to processing time. Finally, detected pulses 418 that are characterized with further processing are shifted still further in time from the FFT output blocks 416. By leveraging the recorded events in the RER, it is possible to even better identify the precise timing, in the time domain, of a given pulse and thereby improve overall classification functionality.

Figure 5:
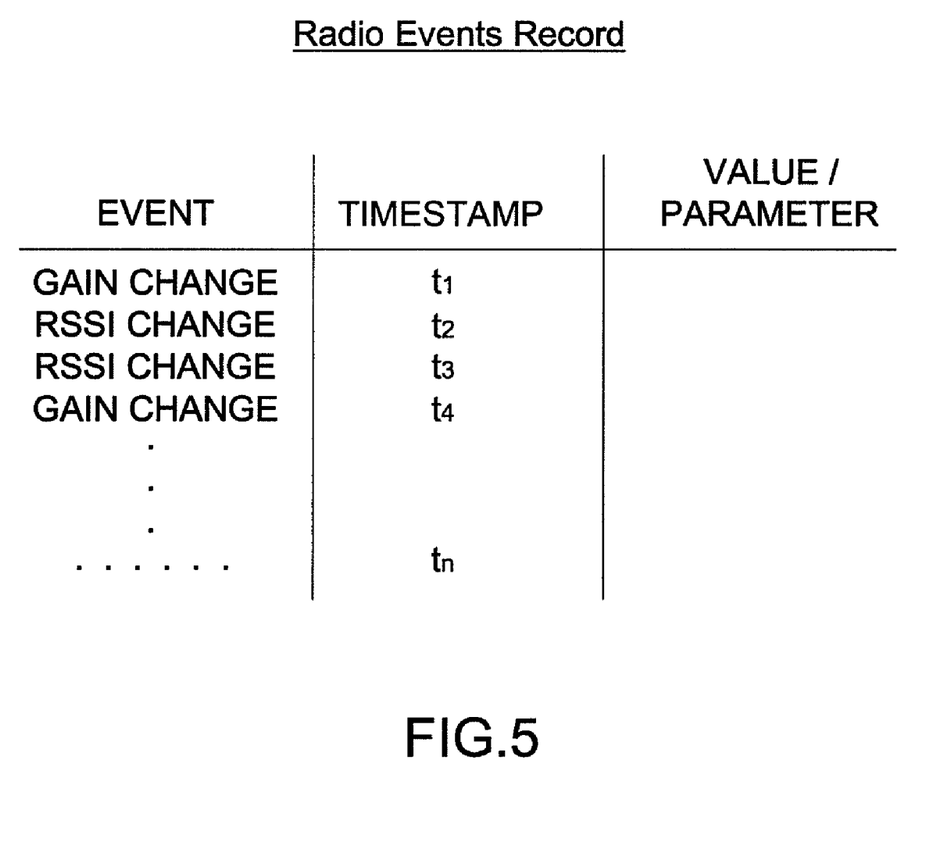
FIG. 5 shows an example of a radio event record in accordance with an embodiment of the present invention.

Thus, in accordance with a first aspect of the present invention, the following information may be captured in an RER like that shown in FIG. 5:
Gain change events
RSSI change events—RSSI increased or decreased by an amount larger than a programmable threshold from previously recorded RSSI values.
Timestamps
Gain state information (For examples, AGC state, gain etc.).
Index into I/Q data with gaps such as during gain change.

Figure 6:
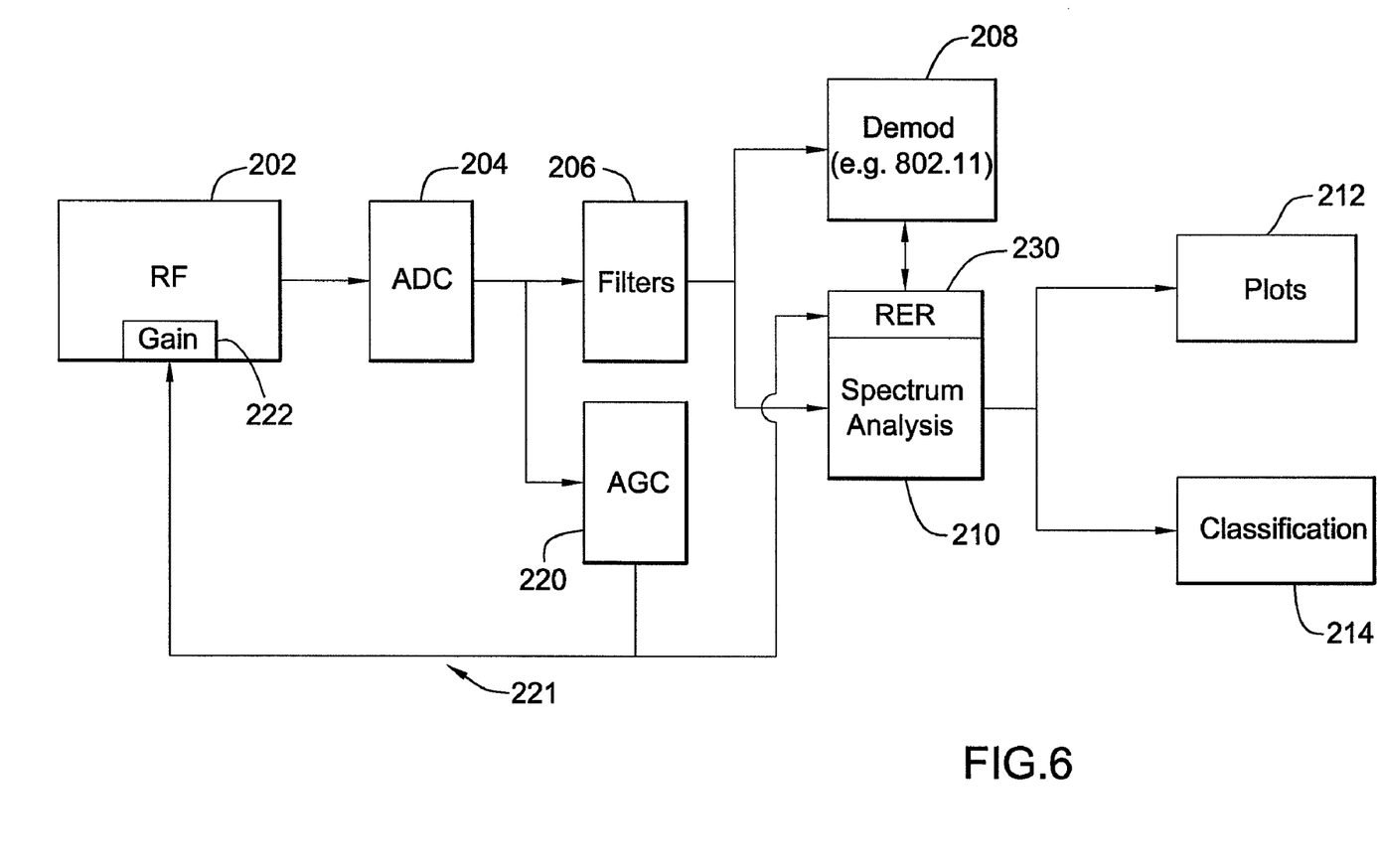
FIG. 6 is a block diagram of a system including a spectrum analysis engine and wireless demodulator using a shared radio in accordance with an embodiment of the present invention.

FIG. 6 is a block diagram depicting an embodiment of the present invention in which a single RF receiver 202 is shared between the spectrum analysis module 210 and a wireless demodulator 208. More specifically, and as explained with respect to FIG. 6, the RF receiver 202 receives over-the-air transmissions and feeds the received signals to an analog-to-digital converter (ADC) 204 for digitization. The resulting digitized signals are filtered with filters 206 and then passed, on the one hand, to the demodulator 208, such an 801.11x demodulator and, on the other hand, to the spectrum analysis module 210 for simultaneous processing. Demodulator 208 is used as a traffic monitoring section (or as part of a WiFi access point), like that shown in FIG. 1. Those skilled in the art will appreciate that demodulator 208 may be configured to monitor other types of traffic including Bluetooth™ communications, among others. RER module 230, in this embodiment, is in communication not only with AGC 220, but also with demodulator 208.

There are several benefits to having an RER in connection with the architecture of FIG. 6 as well. For example, the state of the demodulator 208, or modem, may provide helpful information for spectrum analysis, particularly if the SAgE is designed to identify, e.g., non-802.11 signals.

More specifically, during a radio transmit operation, the receive stream may be useless or unavailable, based on the radio design. As such, data (such as I/Q samples) collected during this time, may be of no practical use. Similarly, if a complete frame of, e.g., an 802.11 protocol is successfully received, that frame or pulse can usually be excluded from further spectrum analysis (to reduce processing overhead), as the classification of such a pulse is readily identifiable.

Figure 7:
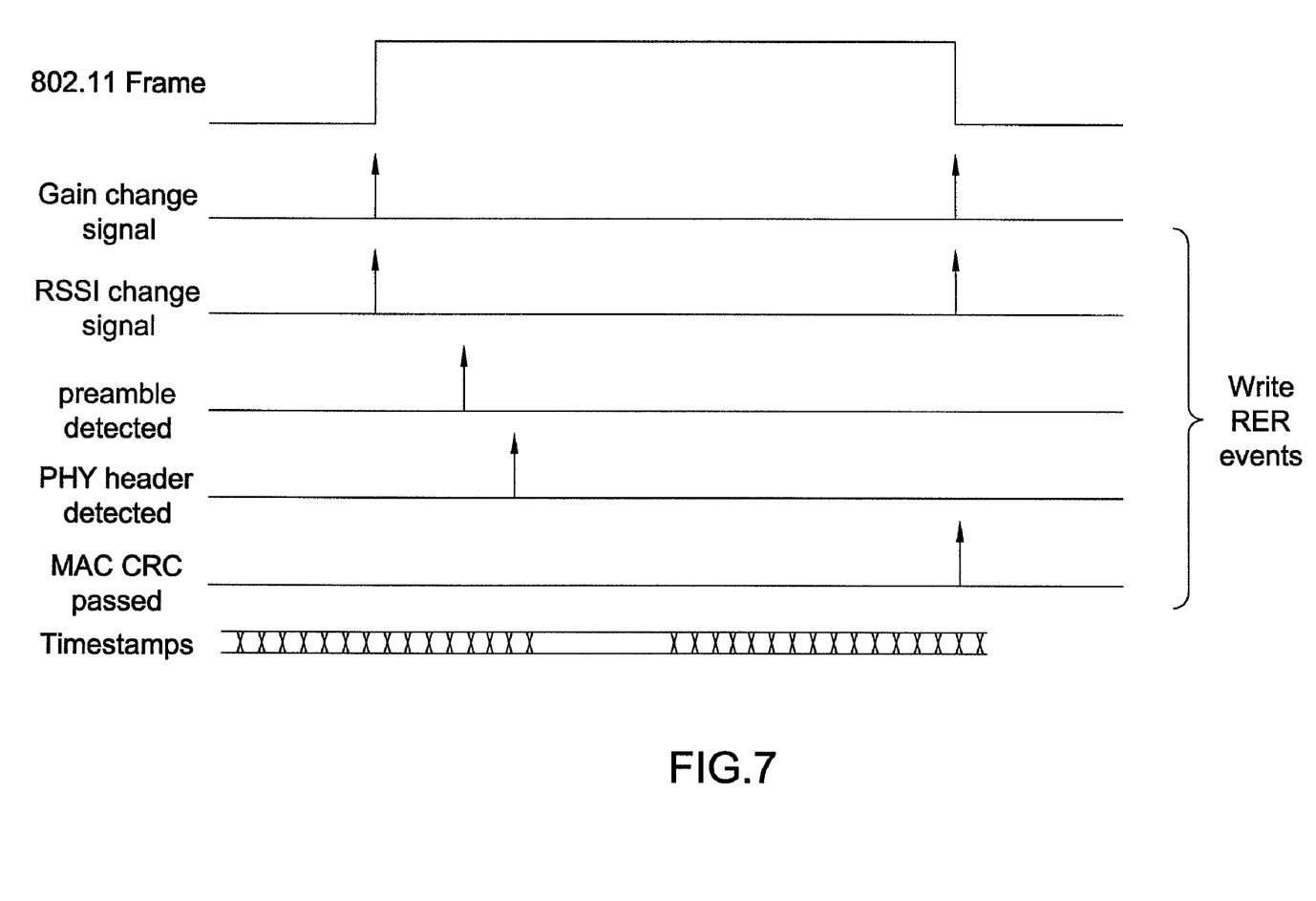
FIG. 7 is a timing diagram showing protocol-based radio events in accordance with an embodiment of the present invention.
Figure 8:
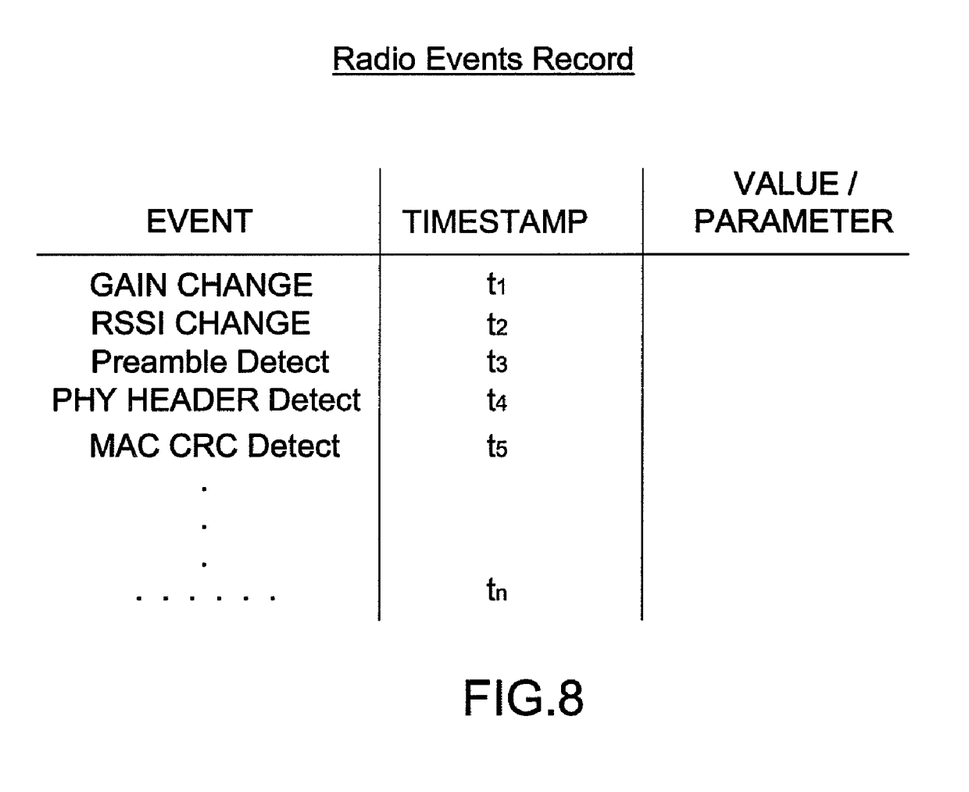
FIG. 8 shows another example of a radio event record including protocol-based radio events in accordance with an embodiment of the present invention.

Further, depending on the desired "resolution" or degree of granularity of the radio event data, and as shown in FIG. 7, in addition to recording in an RER gain change and RSSI changes, several additional protocol-based events may be recorded, in accordance with a second aspect of the present invention. For example, protocol detection might be further decomposed into various receive states such as sync correlation (not shown), preamble detection, PHY header detection, address matching (not shown), or valid MAC CRC detection. As before, a timestamp is preferably associated with each of the foregoing protocol-based events and, together, stored in an RER table. FIG. 8 depicts an RER table that includes not only the gain and RSSI changes, but also the protocol-based events. All of this information can then be used to augment or improve spectral analysis post processing.

One of the more efficient uses of the protocol-based events is to employ them to suppress "unnecessary" I/Q data capture. For example, with, e.g., a successful receipt of a PHY header, it may be assumed that the entirety of the remainder of the pulse associated with that PHY header contains I/Q data associated with an 802.11 frame. Accordingly, there may be no need to further burden the data bus and associated memory of the system with data that need not be further analyzed.

Alternatively, where the RER data indicates that a CRC has not passed, such data may be used as a trigger to initiate post processing of the related I/Q data in an effort to identify a root cause of the failure.

When raw I/Q samples are captured for spectrum analysis purposes, they can also be used to augment the primary protocol. For example, as is explained more fully later herein, Dynamic Frequency Selection (DFS) radar detection may be improved, Root Cause analysis on bad packets may be more easily implemented, and improved timing sync between access points may be realized, among other augmentation benefits.

Figure 9:
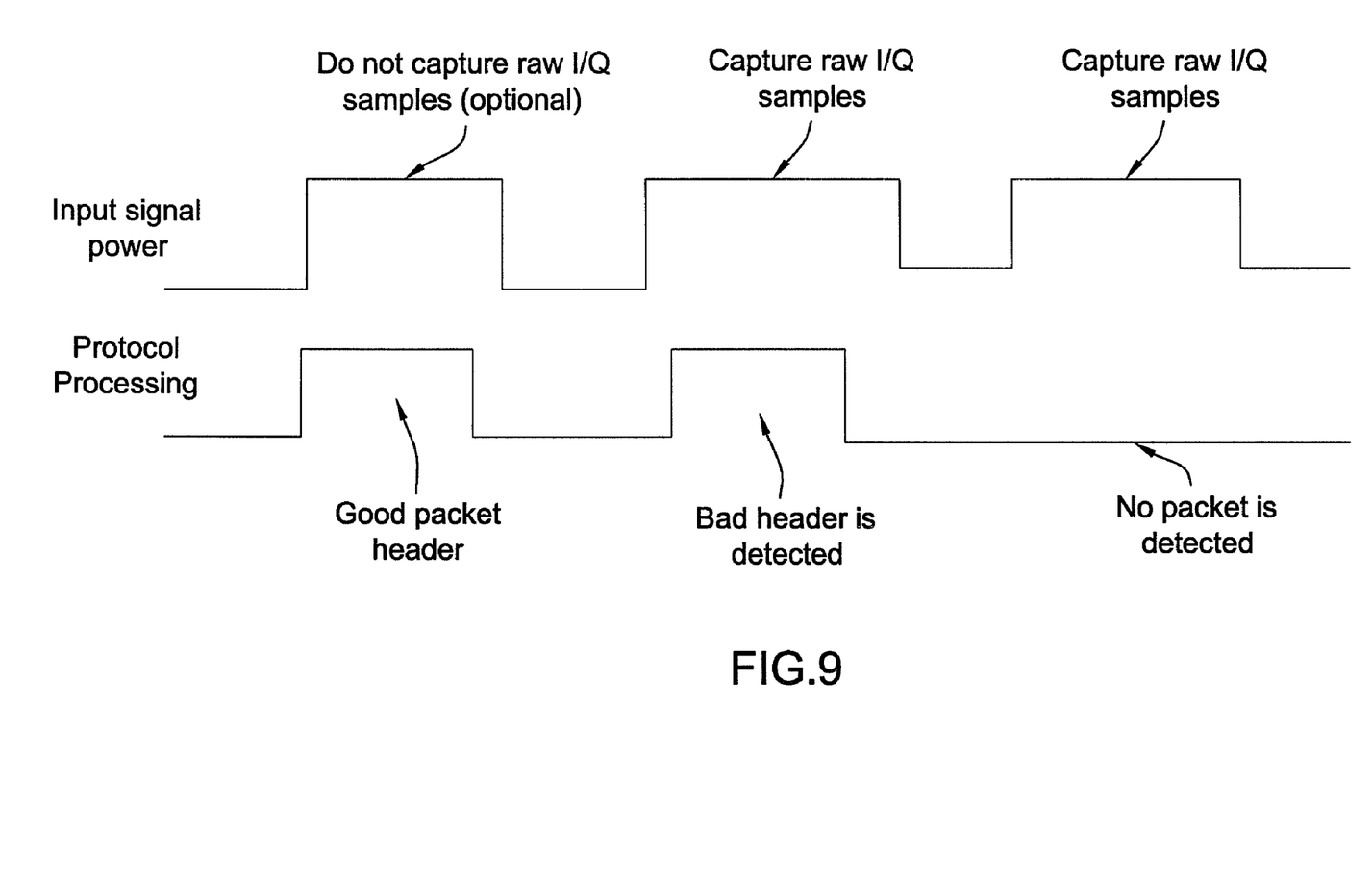
FIG. 9 is a timing diagram that illustrates when raw in-phase/quadrature (I/Q) sample data is preferably collected, and not collected, in accordance with an embodiment of the present invention.

FIG. 9 shows a timing diagram depicting how when a good packet header (of, e.g., an 802.11 frame) is detected, the capture of raw I/Q data may optionally be eliminated. This contrasts with the case wherein a bad packet is detected or no packet is detected at all, as also shown in FIG. 9. In the two latter cases, it is preferable to buffer the raw I/Q data samples and perform spectrum analysis of the relevant time periods to determine what energy may have been present, generally, or what energy may have interfered with an expected protocol frame. Of course, the system and methodology of the present invention can also be configured to capture or collect I/Q samples whatever the state of the modem.

Figure 10:
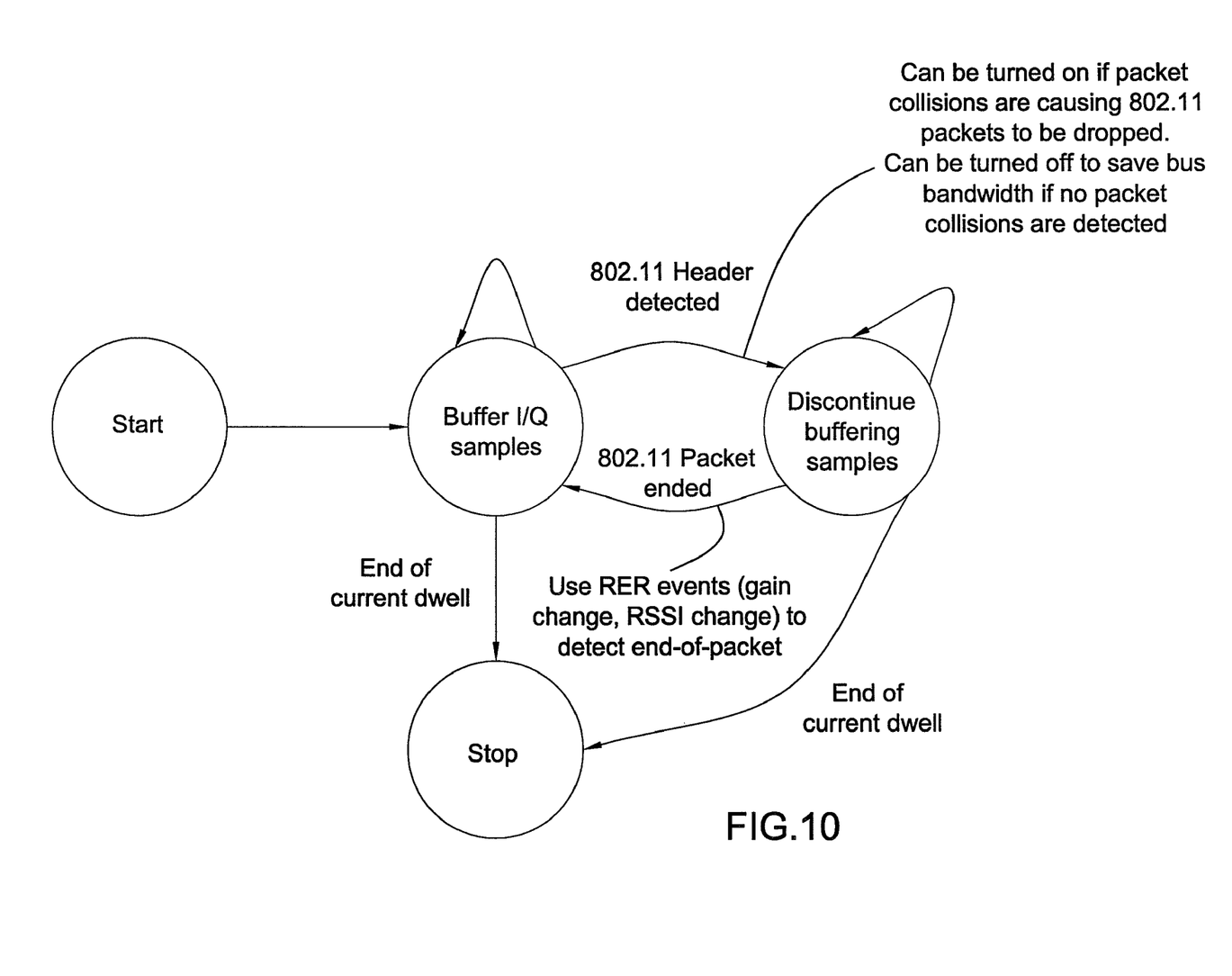
FIG. 10 is a state diagram that illustrates when I/Q samples are collected, and not collected, in accordance with an embodiment of the present invention.

FIG. 10 depicts a state machine that may be implemented to suppress buffering of "unnecessary" I/Q data and thereby optimize bus and memory utilization. As shown in the figure, a default state might be to buffer I/Q samples. Once, e.g., an 802.11 header is detected, the buffering of the sample can be discontinued until such time as, e.g., the 802.11 packet has ended. Since the several components of an 802.11 packet are well defined (e.g., PHY header through CRC), the length of time of a pulse associated with a given 802.11 packet can be determined. Thus, sample buffering can be discontinued for an amount of time that corresponds to the length of time to receive an entire packet. If the current dwell time (a predefined duration over which data is monitored by spectrum analysis module 210) has ended, then sample buffering may also be stopped.

The original 802.11 specification defines 20 MHz wide channels, but the new 802.11n specification also defines a new 40 MHz wide channel. In 40 MHz mode, it is possible that the RF receiver 202 will receive a 20 MHz wide signal (either on the lower-end or upper-end of the spectrum). In this case it is possible to buffer samples for only the portion of the spectrum where 802.11 signal is not present (again to save memory and bus bandwidth). This may be accomplished by implementing two decimation filters (not shown), wherein one filter selects the lower-half of the spectrum while the other filter selects the upper-half of the spectrum.

Figure 11:
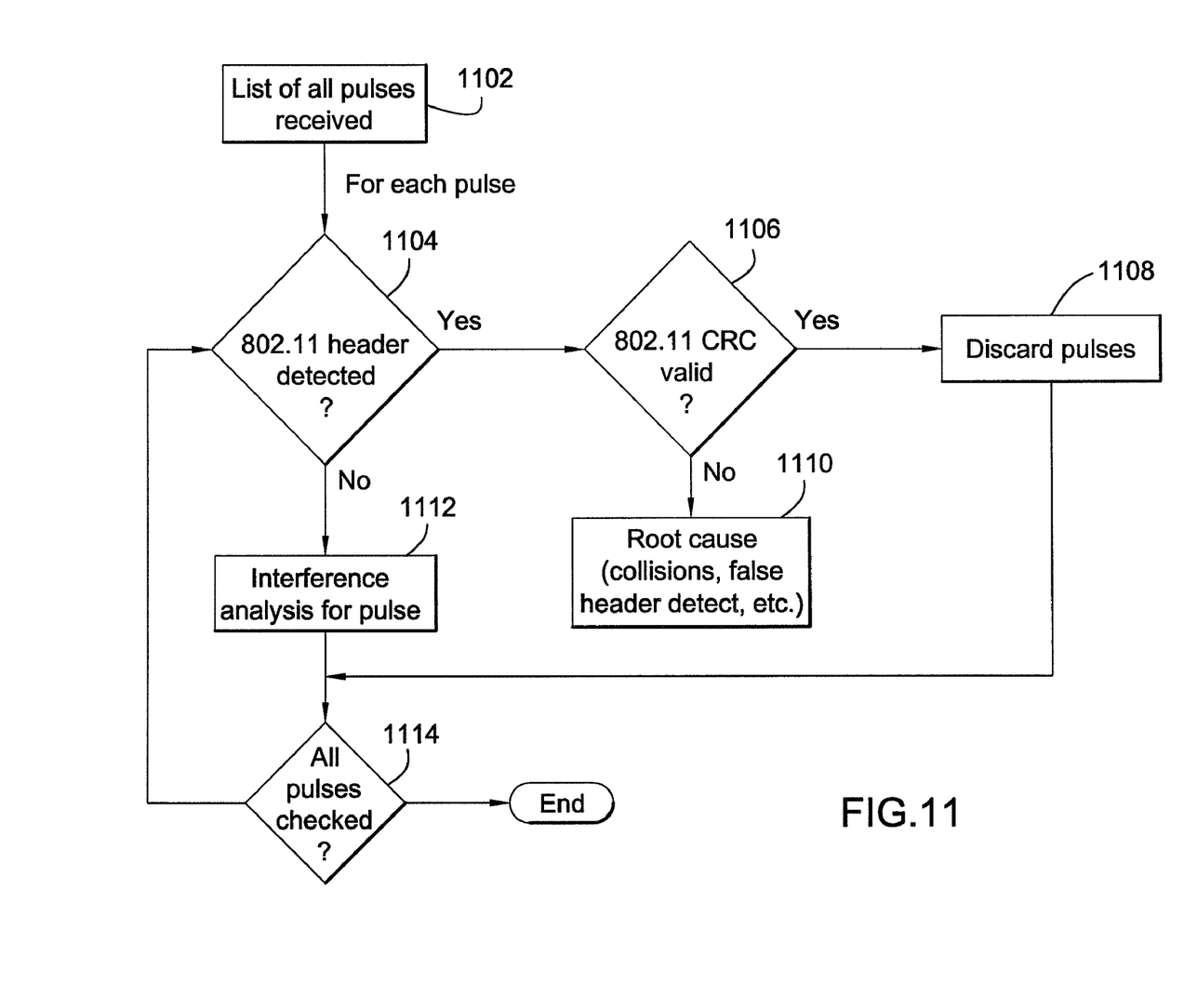
FIG. 11 is a flowchart depicting a pulse post processing methodology in accordance with an embodiment of the present invention.

FIG. 11 is a flowchart depicting a post process methodology in accordance with an embodiment of the present invention. At step 1102, a listing of all pulses is prepared. At step 1104, it is determined, for each pulse, whether an 802.11 header has been detected. If yes, it is then determined, at step 1106, whether a valid 802.11 CRC has been detected. If yes, then the given pulse is discarded, as indicated by step 1108. In other words, if the pulse is determined to be associated with a valid 802.11 packet, then there is no need to conduct further spectrum analysis processing to identify the pulse. Consequently, the pulse may be discarded. The process proceeds to step 1114, explained below.

However, if at step 1104 a header was not detected, the nature of the pulse may be unknown and interference analysis for the pulse is performed as indicated by step 1112. Step 1114 then provides a loop back to perform analysis of a next pulse in the list. If, at step 1104, a header was detected, but at step 1106 a valid CRC was not detected, then the methodology preferably undertakes a root cause analysis of the failure, as indicated by step 1110. A root cause may be, for example, a collision, or a false header detect, among others. The process then moves to step 1114.

Thus, as will be understood by those skilled in the art, by leveraging radio events including AGC and RSSI changes as well as protocol-based radio events, it is possible to more quickly process FFT-derived pulse data and "zero in" on other pulses for which further analysis may be beneficial.

From the foregoing, those skilled in the art will appreciate the utility of leveraging a Radio Events Record in connection with spectrum analysis. The following table provides a more comprehensive, but non-limiting, list of radio events and the types of records that may be recorded in an RER table in accordance with embodiments of the present invention. A more detailed discussion of each of the radio events and their respective utility in an overall spectrum analysis system follows.

| Radio Event | Records written |
|---|---|
| Gain change on antenna n (n = 1, 2, . . . ). | Timestamp and index into SB data Gain value Noise floor level RSSI value |
| Rx signal on/off indicator for each antenna | Timestamp and index into SB data Gain value Noise floor level RSSI value |
| RSSI change | Timestamp and index into SB data RSSI value |
| Transmit events | Timestamp and index into SB data Transmit on/off signal |
| 802.11 Rx events | Timestamp and index into SB data 802.11 header detect (on partial spectrum or full-spectrum) 802.11 CRC valid MAC trigger |

Gain Change

As is well known in the art, independent AGC loops are typically implemented on each of a plurality of antennas. Thus, radio events may be recorded with respect to each antenna. However, in many cases, it is possible to monitor and record events that are associated with only a single one of the antennas for purposes of the instant invention. Of course, specific circumstances will dictate the appropriate implementation.

For a given gain change there is an associated settling time. In accordance with an embodiment of the present invention, I/Q samples captured during the settling time can be discarded or never even buffered. In one implementation, the last valid I/Q sample based on the older gain value is referenced in one RER record and the first valid I/Q sample based on the new gain value is similarly referenced by another RER record. I/Q samples between the markings (i.e., during the gain settling time) may be discarded and marked as invalid.

The performance of some detection algorithms requires knowledge of noise floor. For example, a pulse detection circuit uses the noise floor information to detect pulses that are a certain threshold above the noise floor. The noise floor of the receiver depends on the gain value. Accordingly, when the gain changes, I/Q samples must be correctly associated with the corresponding noise floor. The information collected in an RER table can facilitate this association.

For FFT processing in, e.g., spectrum analysis module 210, an FFT block should be marked valid only if the I/Q samples in the FFT block are valid and correspond to a unique gain value. That is, samples taken during a gain change may be of limited use in connection with spectrum analysis. Thus, keeping track of the timing of gain change events in an RER table can improve overall spectrum analysis by eliminating potentially problematic FFT blocks. From a practical standpoint, such FFT blocks are preferably dropped by hardware since, in one current implementation, the statistics logic block (not shown) of the spectrum analysis module 210 is configured to generate data aggregated over a stream of multiple FFT's, and thus if suspect FFT's or FFT's from different gain settings part of data set, the results may be tainted.

Further, to save bus bandwidth and memory (e.g., snapshot buffer 140), hardware may be designed/configured to suppress writing I/Q samples during a gain transition. More specifically, a gain change event may trigger the hardware to cease I/Q sample buffering, since data collected during the transition may be suspect.

It is further possible, in accordance with the present invention, using differences in timestamps between gain change events to determine the duration of a given pulse. Since FFT based spectrum analysis may not provide accurate pulse duration (see, e.g., FIG. 3 and related text), the pulse durations derived from gain changes may be used for signal classification. One practical example of a use for this feature of the present invention is for Dynamic Frequency Selection (DFS) radar detection.

Specific to 802.11, there are requirements to avoid operating in the same spectrum as DFS radar. On some channels in some countries, Radar is designated as the primary user of the spectrum and 802.11 is relegated to being a secondary user that must not interfere. DFS radar signals have varying pulse widths and pulse repetition intervals, and are usually received in conjunction with other signals (e.g., 802.11 or other sources). A histogram of pulse widths developed with the data in the RER can be used to group pulses with similar duration for subsequent analysis by the classification module 214, thereby facilitating DFS radar detection.

Thus, the RER of the present invention, in combination with the spectrum analysis engine (SAgE) 210, provides a general purpose solution to DFS detection, rather than a narrow point solution. With spectrum analysis alone, it is difficult to precisely identify a pulse width of a given pulse or a pulse repetition rate. However, by leveraging I/Q samples (using the RER), it is possible in accordance with the present invention to achieve better DFS (or other non-802.11 pulse) detection. For example, software DSP algorithms can be used to analyze data to improve detection and reduce false alarms. Typically, such algorithms may be difficult/expensive to implement as hardware logic.

Another use for the record of gain changes and timestamps is to provide accurate start times and samples offsets for various signals for post-processing of I/Q data. For example, the data may be employed to better find a synchronization field of a known protocol (e.g., 802.11). Deriving an accurate estimate of the start time using data in an RER table reduces the search window (and hence the processing overhead) to find a synchronization word.

Receiver Signal On/Off Indicator

The receiver 202 may be temporarily turned off for various reasons such as tuning a synthesizer, resetting AGC loops, power save, etc. These on/off events may also be recorded in an RER table for at least the reasons indicated with respect to gain change events. As well, the receiver signal off event may be used by hardware as a trigger to write records from a previous receive burst and to clear hardware state machines to process a subsequent burst.

RSSI Changes

Receive signal levels could change for a short burst without causing gain changes (due, e.g., to hysteresis in the AGC loops 221). RSSI changes may thus also be recorded since RSSI changes can provide accurate timestamps for the start and end of a pulse. RSSI changes may also be recorded when the gain changes as well. The following processing is associated with instances of RSSI changes.

A sudden jump in signal levels can cause spectral splatter in FFT outputs. Using an RER table to "mark" FFTs with signal transitions can prevent spectral splatter from corrupting spectrum plots.

RSSI change events can also be used to identify start and end of pulses (in the same fashion described above for gain change events). Additionally, it is not uncommon for short pulses to overlap with longer pulses in time, and RSSI change event records can be used to identify such short pulses.

Further, signals using Time-Domain Duplex (TDD) can cause the AGC loop 221 to attack each burst. Depending on the duration of the pulses and the gap between pulses, this may cause too many gain changes (which is detrimental to spectrum analysis for the reasons noted elsewhere herein). One approach to address this phenomenon is to put hysteresis in the AGC to avoid gain changes. Where such hysteresis is implemented, RSSI records can be used as explained above to record, more accurately, the start and end of the pulses. Accurate start and end time of pulses also helps to reduce processing overhead when I/Q samples are post-processed to find the synchronization word, as mentioned earlier in connection with gain change events.

Similar to the discussion for using gain changes to detect DFS radar, RSSI records can be used in conjunction with gain records to identify pulse widths for radar detection. DFS radar requirements list signal levels above which 802.11 radios must vacate the channel on detection of radar. Since the RSSI values are captured for these pulses they provide an easy filter for radar identification. A big challenge for radar detection is avoidance of false detect on off-channel signals. Detectors based purely on pulse widths and RSSI levels can easily provide false triggers on strong off-channel radar or other signals with similar characteristics. For example, an off-channel signal at −20 dBm may be suppressed by 40 dB by a receive filter but it might still be above the DFS threshold. However, the measured RSSI value (−60 dBm) will not be consistent with the gain value—front-end gains (e.g., LNA) before receive filtering would be turned off because they see a very strong signal. By checking for consistency between gain and RSSI records the falsing on off-channel can be reduced. Other mechanisms to reduce false detections include post processing I/Q data for pulses matching statistic tests. Frequency tests can be used to detect off channel radar, and Chirp detection can rule out falsing on other signals such as 802.11 collisions.

Transmit Events

For radios that can transmit and receive (e.g., 802.11 radios), spectrum analysis is preferably turned off during the duration when the radio is in transmit mode. If not, the receiver will only be able to see the transmitted signal which will drown any other signal present in the network. By monitoring transmit on/off events, unnecessary processing by the spectrum analysis module 210 can be avoided.

802.11 Receive Events

As mentioned, preamble, header, and valid MAC CRC can be detected and used to optimize the processing of I/Q data. Furthermore, a trigger could be based on an Address match. With 802.11 it could be matching an implied address, as the source Address is not included in some control frames. Frame matching, as part of overall 802.11 receive events, could also be aimed at specific types of frames, such as ones matching a detected type of attack, or special packets sent to calibrate for Beam forming or locking timing between access points.

From the foregoing, those skilled in the art will appreciate how the implementation of a radio events record can help to further improve spectrum analysis processing in connection with a wireless channel being used for, e.g., 802.11 type traffic.

It will be apparent to those skilled in the art that various modifications and variations can be made in the systems and methods described herein consistent with the principles of the present invention without departing from the scope or spirit of the invention. Although several embodiments have been described above, other variations are possible consistent with the principles of the present invention.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. A method comprising:
    collecting in-phase/quadrature (I/Q) data representing energy detected by a radio in a frequency band;
    performing, using a fast Fourier transform (FFT) processor, a FFT transform on the I/Q data resulting in a stream of FFT blocks;
    recording, in memory, in a radio events record, at least one radio event and a corresponding marker that are indicative, respectively, of a type and time of a state change during the collecting step, wherein the state change comprises a state change in an automatic gain control loop of the radio; and
    selecting I/Q data and FFT blocks to be analyzed, wherein the selecting is based on the time of the state change in the automatic gain control loop to identify a given pulse in the energy detected by the radio.

2. The method of claim 1, wherein the state change is a state change in a received signal strength indicator.

3. The method of claim 1, wherein the at least one radio event includes a wireless protocol-based event.

4. The method of claim 3, wherein the protocol-based event comprises detection of a packet preamble.

5. The method of claim 3, wherein the protocol-based event comprises detection of a physical layer header.

6. The method of claim 3, wherein the protocol-based event comprises detection of a passed media access control cyclic redundancy check.

7. The method of claim 1, further comprising using the at least one radio event to identify a portion of collected I/Q data that corresponds with one or more successive FFT blocks in the stream of FFT blocks.

8. The method of claim 1, wherein the markers comprise a timestamp.

9. The method of claim 1, wherein a radio event comprises an 802.11 protocol event.

10. A method comprising:
    collecting in-phase/quadrature (I/Q) data representing energy detected by a radio in a frequency band;
    performing, using a fast Fourier transform (FFT) processor, a FFT transform on the I/Q data resulting in a stream of FFT blocks;
    identifying, using the stream of FFT blocks, a pulse in the frequency band;
    recording, in memory, in a radio events record, a plurality of radio events and corresponding markers that are indicative, respectively, of a type and time of individual state changes in the radio during the collecting step;
    using at least two of the radio events to identify, in the time domain, a beginning time and end time of the pulse detected in the stream of FFT blocks, wherein at least one of the radio events comprises a gain change associated with an automatic gain control loop; and
    analyzing selected I/Q data and FFT blocks based on the time of the state change in the automatic gain control loop to identify a given pulse in the energy detected by the radio.

11. The method of claim 10, wherein at least one of the radio events is a change in a received signal strength indicator.

12. The method of claim 10, further comprising detecting a protocol-based event.

13. The method of claim 12, further comprising suspending the collecting step in response to detecting the protocol-based event.

14. The method of claim 12, wherein the protocol-based event comprises detection of a packet preamble.

15. The method of claim 12, wherein the protocol-based event comprises detection of a physical layer header.

16. The method of claim 12, wherein the protocol-based event comprises detection of a passed media access control cyclic redundancy check.

17. The method of claim 10, further comprising determining a pulse duration and pulse repetition rate using the radio events record.

18. The method of claim 17, further comprising detecting Dynamic Frequency Selection radar based on the pulse duration and pulse repetition rate.

19. Logic encoded in one or more non-transitory tangible media for execution and when executed operable to:
    collect in-phase/quadrature (I/Q) data representing energy detected by a radio in a frequency band;
    perform a fast Fourier transform (FFT) on the I/Q data resulting in a stream of FFT blocks;
    identify, using the stream of FFT blocks, a pulse in the frequency band;
    record in a radio events record a plurality of radio events and corresponding timestamps that are indicative, respectively, of a type and time of individual state changes in the radio at the time I/Q data is collected, wherein the state change comprises a state change in an automatic gain control loop of the radio; and
    analyze selected I/Q data and FFT blocks based on the time of the state change in the automatic gain control loop to identify a given pulse in the energy detected by the radio.

20. The logic of claim 19, further operable to use at least two of the radio events to identify, in the time domain, a beginning time and end time of the pulse.

21. The logic of claim 19, wherein at least one of the radio events is a change in a received signal strength indicator.

22. The logic of claim 19, further comprising logic to detect a protocol-based event and record the same in the radio events record.

* * * * *